United States Patent
Wuergler et al.

(10) Patent No.: US 9,731,568 B2
(45) Date of Patent: Aug. 15, 2017

(54) GUIDED TOW HITCH CONTROL SYSTEM AND METHOD

(71) Applicant: GM GLOBAL TECHNOLOGY OPERATIONS LLC, Detroit, MI (US)

(72) Inventors: Michael A. Wuergler, Clarkston, MI (US); Robert D. Sims, III, Milford, MI (US); Mohannad Murad, Troy, MI (US); Luis A. Reyes Lopez, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/955,638

(22) Filed: Dec. 1, 2015

(65) Prior Publication Data

US 2017/0151846 A1    Jun. 1, 2017

(51) Int. Cl.
| | |
|---|---|
| G08B 21/00 | (2006.01) |
| B60D 1/36 | (2006.01) |
| B60R 1/00 | (2006.01) |
| H04N 7/18 | (2006.01) |
| G01C 22/00 | (2006.01) |
| B60G 23/00 | (2006.01) |
| B62D 11/00 | (2006.01) |

(52) U.S. Cl.
CPC ............... B60D 1/36 (2013.01); B60R 1/00 (2013.01); *B60R 2300/808* (2013.01)

(58) Field of Classification Search
CPC ........ B60D 1/36; B60R 1/00; B60R 2300/808
USPC ......................................................... 340/431
See application file for complete search history.

(56) References Cited

U.S. PATENT DOCUMENTS

| | | | | |
|---|---|---|---|---|
| 2002/0145663 | A1* | 10/2002 | Mizusawa | B60D 1/36 348/118 |
| 2005/0074143 | A1* | 4/2005 | Kawai | B60D 1/36 382/104 |
| 2008/0231701 | A1* | 9/2008 | Greenwood | B60R 1/00 348/148 |
| 2012/0191285 | A1* | 7/2012 | Woolf | B60D 1/36 701/25 |

(Continued)

OTHER PUBLICATIONS

Prematunga et al., Finding 3D Positions From 2D Images Feasibility Analysis, ISBN 978-1-61208-184-7, Icons 2012: The Seventh International Conference on Systems, Feb. 29, 2012-Mar. 5, 2012, Saint Gilles, Reunion Island.

*Primary Examiner* — Jack K Wang
(74) *Attorney, Agent, or Firm* — Quinn IP Law

(57) ABSTRACT

A method and system provide guided control of a hitching operation between a tow vehicle and a trailer. Dynamic pixel images are collected of the first and second hitch devices using a camera. The position of the second hitch device is determined using the controller. A first graphical overlay to the dynamic pixel images is displayed, with the first graphical overlay, e.g., guidelines, depicting a path of the tow vehicle. A distance between a calibrated position of the first hitch device and the determined position of the second hitch device is calculated and a second graphical overlay is displayed on zoomed-in images when the calculated distance is less than a calibrated distance. The second graphical overlay provides indicia of the positions of the first and second hitch devices. A control action executes when the second graphical overlay indicates substantial overlap or concentric alignment of the indicia of the respective positions.

20 Claims, 4 Drawing Sheets

(56) References Cited

U.S. PATENT DOCUMENTS

2014/0324295 A1* 10/2014 Lavoie .................. B62D 13/06
                                                    701/41
2015/0115571 A1    4/2015 Zhang et al.
2015/0321666 A1* 11/2015 Talty ....................... B60D 1/62
                                                    701/41

* cited by examiner

GUIDED TOW HITCH CONTROL SYSTEM AND METHOD

TECHNICAL FIELD

The present disclosure relates to a guided tow hitch control system and method.

BACKGROUND

A trailer, fifth wheel, or other non-powered wheeled structure may be towed behind a vehicle using a trailer hitch assembly. While trailer hitch assemblies come in various configurations, a typical configuration includes a trailer coupler and a hitch ball. The trailer coupler, which is connected to the trailer, includes a trailer tongue that extends from the trailer. A cup of the trailer tongue is positioned around a hitch ball, which in turn is connected to the tow vehicle. The trailer coupler locks into place via a lever and retaining pin. A properly hitched trailer forms a single structural unit with the tow vehicle that is able to negotiate turns while remaining stable on a roadway. However, because the hitch ball is located at the rear end of the tow vehicle, it may be difficult for an operator to properly align the hitch ball and the trailer coupler during a hitching operation, particularly in low lighting conditions.

Modern vehicles include one or more cameras that provide back-up assistance. Rear camera systems used for back-up assistance may employ visual overlay graphics that are superimposed on a camera image to provide back-up steering guidance. Camera images and vehicle coordinates in such operations are related via a calibration process that determines camera parameters, e.g., focal length, optical center, orientation, and position. Camera modeling techniques may be used which help account for the height of the trailer tongue above ground level, while also modeling the motion of the tow vehicle with respect to a center of rotation while an operator steers the vehicle. However, camera-based techniques for guiding back-up operations may be less than optimal when applied to a trailer hitching operation, particularly during close-up control phases of the trailer hitching operation.

SUMMARY

A method is disclosed herein that is intended to improve upon possible limitations in existing trailer hitching operations. The method enables guided control of a hitching operation between a tow vehicle having a first hitch device and a trailer having a second hitch device, e.g., a hitch ball and a trailer coupler, respectively. The method includes collecting dynamic pixel images of the first and second hitch devices using a digital or analog camera connected to the tow vehicle, and then determining a position of the second hitch device relative to the first hitch device via a local positioning device, e.g., using a transmitter and receiver pair as set forth below. The method further includes displaying a first graphical overlay to the dynamic pixel images on a display screen during a first phase of the hitching operation. The first graphical overlay, e.g., guidelines which are dynamically adjusted in orientation, weight, and/or color in response to a changing steering angle, depict a projected or anticipated path of the tow vehicle to the trailer coupler.

Additionally, the method includes calculating, via the controller, a linear distance between a calibrated position of the first hitch device and the determined position of the second hitch device. A second graphical overlay is then displayed, again via the controller using the display screen, including automatically controlling a zoom level of the camera, when the calculated distance is less than a calibrated distance. The second graphical overlay on the pixel images at the increased zoom level provides a driver of the tow vehicle with indicia of the respective positions of the first and second hitch devices. The controller executes a control action when the second graphical overlay indicates a substantial overlap of the indicia of the respective positions, for instance a concentric overlap as set forth herein, including activating an audio and/or a visual indicator signaling the substantial overlap.

The first or second hitch device may include the local positioning device noted above, which is operable for transmitting raw position data. In such a case, determining the position of the second hitch device includes detecting the raw position data.

The local positioning device may be, by way of non-limiting examples, a light beacon emitting light signals such as a continuous light beam, lidar, or light pulses, a sound wave transmitter emitting sound or radio waves, e.g., an ultrasonic transmitter, or an electromagnetic wave transmitter emitting electromagnetic waves such as radar.

The method may include color-coding the displayed guidelines to represent correct or incorrect alignment of the first and second hitch devices.

Displaying the second graphical overlay may entail displaying, on the dynamic pixel images, an open circle over the trailer coupler and a closed circle on the hitch ball. In this embodiment, the substantial overlap of indicia of the respective positions may entail a concentric overlap of the circles.

A system is also disclosed for providing guided control of a hitching operation between a tow vehicle having a first hitch device and a trailer having a second hitch device. The system includes one or more cameras operable for collecting dynamic pixel images of the first and second hitch devices, and a local positioning device connectable to the first or second hitch device and operable for transmitting raw position signals. The system may also include a receiver in communication with the local positioning device, a display screen, and a controller, with the receiver operable for determining a position of the second hitch device relative to the first hitch device using the transmitted raw position signals.

The controller is programmed to display the first graphical overlay to the dynamic pixel images during a first phase of the hitching operation, and to calculate a distance between a calibrated position of the first hitch device and the determined position of the second hitch device. The controller is also programmed to display a second graphical overlay using the display screen when the calculated distance is less than a calibrated distance, with the second graphical overlay providing indicia of the respective positions of the first and second hitch devices as noted above. The controller then executes a control action when the second graphical overlay indicates a concentric alignment of the indicia of the respective positions, including activating at least one of an audio and a visual indicator signaling the substantial overlap.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
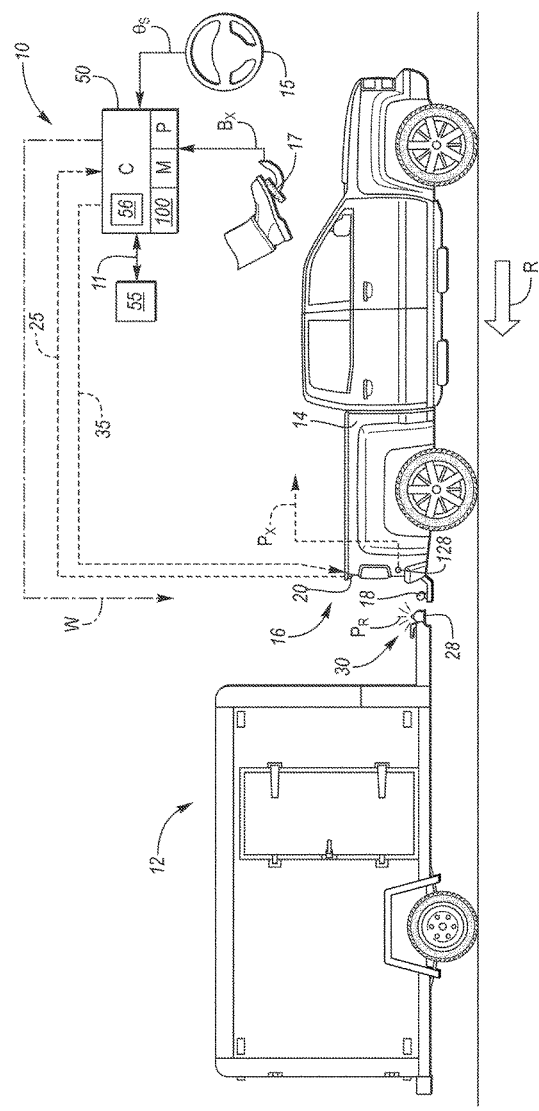
FIG. 1 is a schematic perspective view illustration of an example trailer and a tow vehicle having a controller programmed with guided tow hitch control logic as set forth herein.

Referring to the drawings, wherein like reference numbers refer to like components throughout the several views, an example tow vehicle 10 and trailer 12 are depicted in FIG. 1. While a pickup truck and a conventional trailer are shown for illustrative simplicity, other types of tow vehicles 10 may be used within the intended scope of the disclosure, such as sport utility vehicles or vans. Likewise, the trailer 12 may be embodied as a multi-axle trailer, a fifth wheel, or any other non-powered wheeled structure that may be towed behind the tow vehicle 10.

The tow vehicle 10 includes a first hitch device 18, hereinafter referred to as a hitch ball. The trailer 12 includes a mating second hitch device 28, hereinafter a trailer coupler, both of which are known in the art and configured as described above. Other embodiments may be used without departing from the intended scope of the disclosure, and therefore the method 100 is not limited to the particular configuration of the devices 18 and 28. The tow vehicle 10 is operable backing toward the trailer 12 as indicated by arrow R until the hitch ball 18 correctly aligns with the trailer coupler 28. Once the hitch ball 18 is properly engaged and secured by the trailer coupler 28, the hitching operation is complete. The tow vehicle 10 may thereafter tow the trailer 12 along a road surface.

The tow vehicle 10 of FIG. 1 includes a controller (C) 50 programmed with instructions for executing the method 100. Execution of the method 100, an example of which is depicted in FIG. 4, allows the controller 50 to visually guide a driver of the tow vehicle 10 by exchanging or communicating graphical control signals (arrow 11) with a display screen 55 during a guided hitching operation. That is, the operator is prompted via the display screen 55, i.e., a human machine interface such as a touch-sensitive input screen of the type typically found in a navigation or infotainment system of a vehicle center stack, with graphical overlays in the form of guidelines, geometric shapes, or other graphical indicia as explained below with reference to FIGS. 2A-3C.

The controller 50 includes a processor P and memory M, along with image processing instructions 56 recorded in the memory M. The controller 50 may also include a high-speed clock, analog-to-digital and/or digital-to-analog circuitry, a timer, input/output circuitry and associated devices, signal conditioning and/or signal buffering circuitry. The memory M should include sufficient tangible, non-transitory memory such as magnetic or optical read-only memory, flash memory, etc., as well as random access memory, electrically erasable programmable read only memory, and the like. The controller 50 may receive additional signals, such as braking levels (arrow $B_x$) from a brake pedal 17 and a steering angle ($\theta_s$) from a steering wheel 15 in controlling the hitching operation, or may generate the same in an autonomous manner.

In order to accomplish the method 100, the tow vehicle 10 includes one or more cameras 20 connected to a body 14 of the tow vehicle 10, e.g., proximate a tailgate handle 16. The camera 20 is in communication with the controller 50 via wires or transfer conductors (not shown). The camera 20 is operable for collecting dynamic pixel images or video of the trailer 12, and in particular of the trailer coupler 28, in real time as indicated generally via arrow 25. The dynamic pixel images (arrow 25) may also include the hitch ball 18. The dynamic pixel images (arrow 25) are then displayed with a corresponding zoom level as set forth below with reference to FIGS. 2A-3C depending on the phase of the guided hitching operation.

Figure 2A:
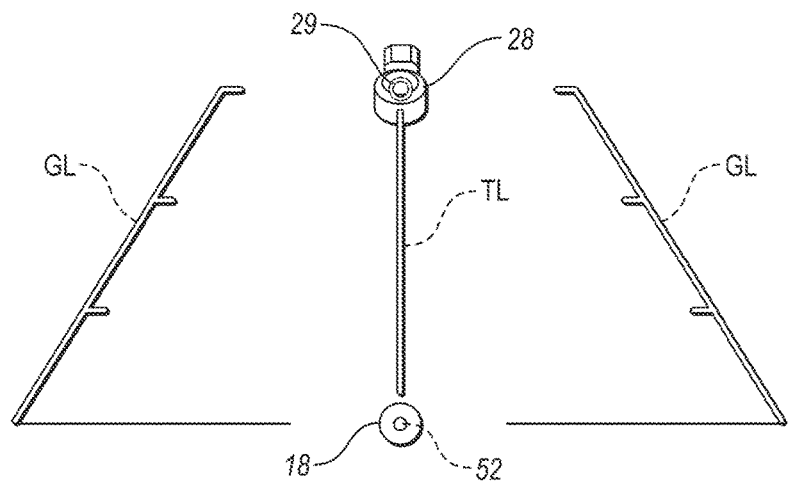
FIGS. 2A-C are schematic illustrations of a hitch ball and trailer coupler and coded graphical overlays that may be presented via a display screen of the tow vehicle of FIG. 1 in a first phase of a trailer hitching operation.
Figure 2B:
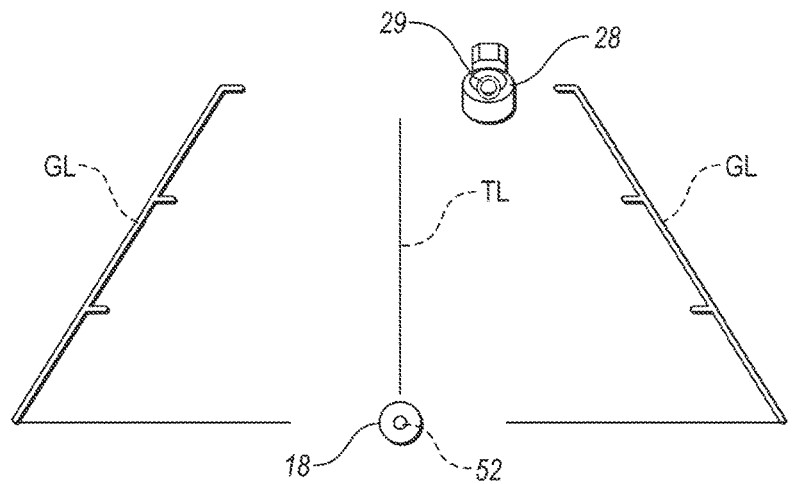
Figure 2C:
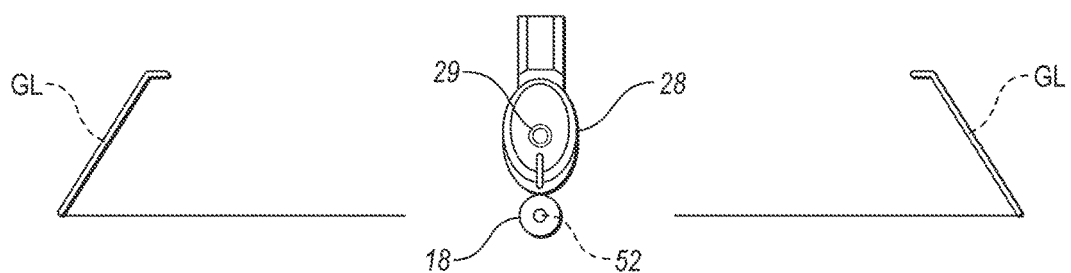
Figure 3C:
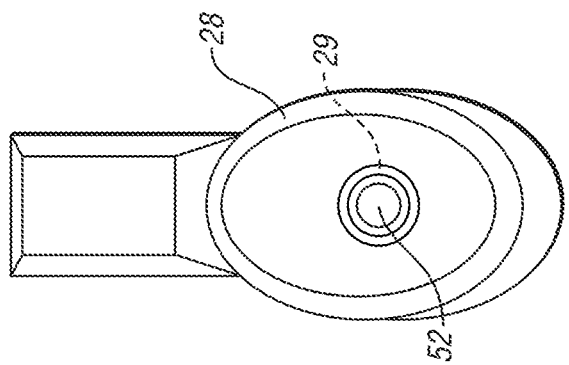
FIGS. 3A-C are schematic illustrations of the trailer coupler and graphical overlays that may be presented via the display screen of the tow vehicle of FIG. 1 in a second phase of the trailer hitching operation.
Figure 3B:
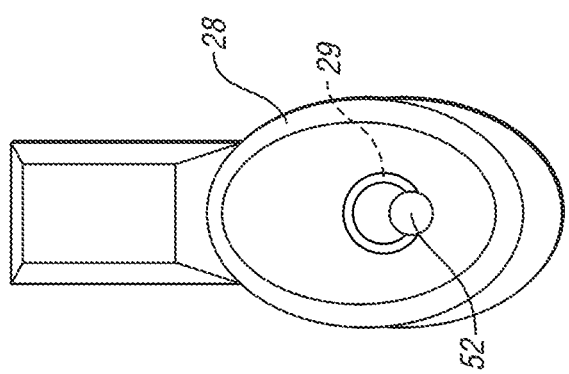
Figure 3A:
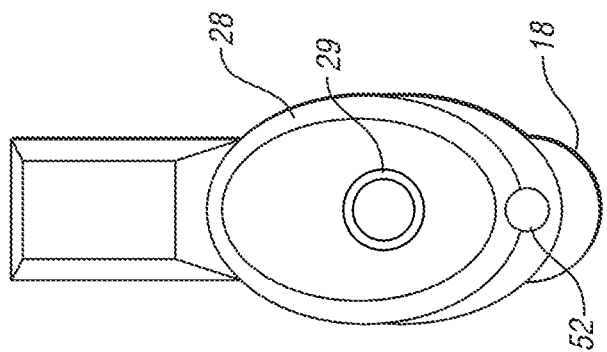
Figure 4:
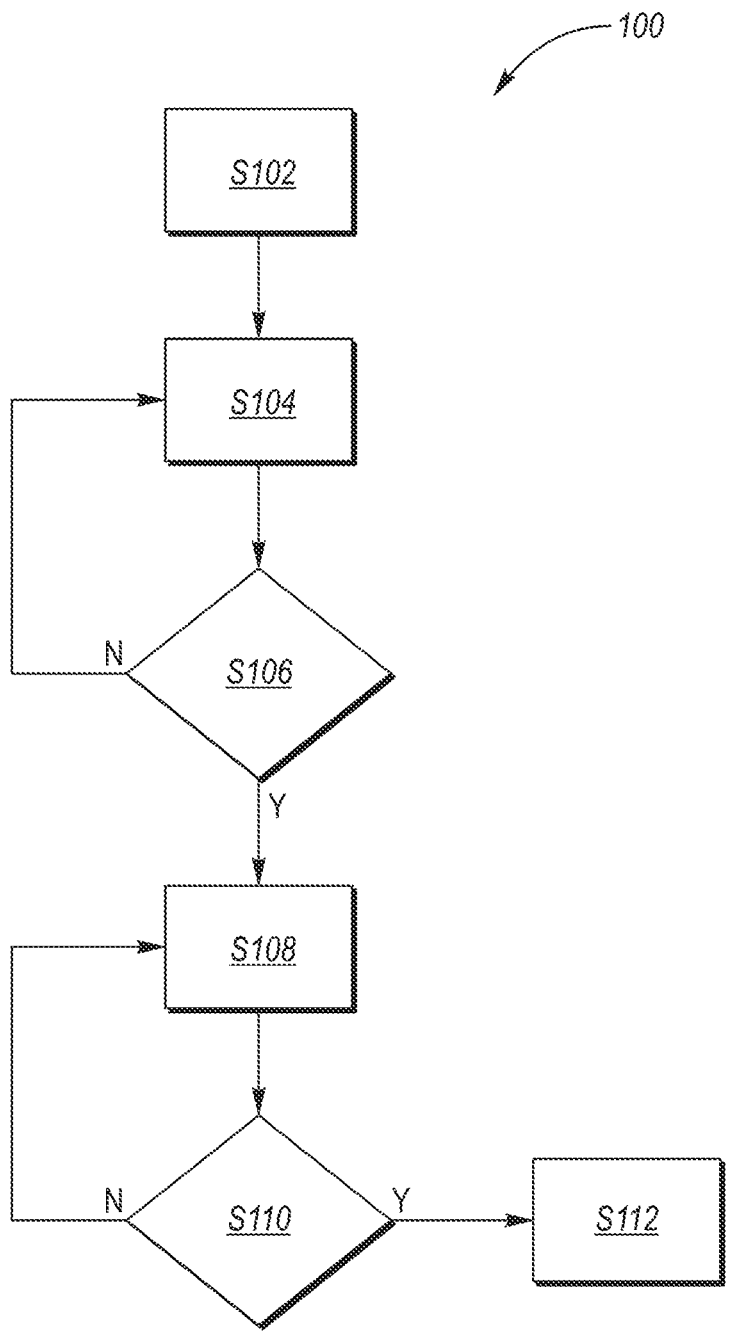
FIG. 4 is a flow chart describing an example embodiment of the present method for providing guided tow hitch control of a trailer hitching operation involving the tow vehicle of FIG. 1.

The method 100 may then progress in terms of automatic adjustment of the resolution of the dynamic pixel images (arrow 25) such that the camera 20 provides normal view images for initial visual acquisition of the trailer coupler 28, as depicted in FIGS. 2A-C, and close-up or zoomed-in images for fine alignment of the hitch ball 18 and trailer coupler 28 as depicted in FIGS. 3A-C. In some embodiments, the controller 50 may control an operation of the camera 20 using active camera control signals (arrow 35), e.g., to command panning, tilting, or optical zoom of the camera 20. In other embodiments, the controller 50 may process the collected pixel images (arrow 25) in software by cropping, zooming, or enhancing the collected pixel images (arrow 25), with the particular embodiment depending on the configuration and capabilities of the camera 20.

A principle of operation of the controller 50 in executing the method 100 is the application of position sensing and machine vision capabilities to a conventional trailer hitching operation. That is, complex machine vision-based functions such as pattern, image, or other feature recognition via, e.g., neural network processing or the use of state machines, may be dispensed with in favor of distance gaging and image resolution progression in a dual-phase target acquisition and identification process. As is known in the art, machine vision gaging involves the imaging of a component, such as the trailer coupler 28 and hitch ball 18, with foreknowledge of the physical sizes and relative positioning of the imaged targets, and the measuring of linear distances between points of interest within the collected image. As such, the image processing instructions 56 may be used alone or in conjunction with transmitters and receivers as set forth below at different phases of the hitching operation in order to accurately determine the relative position and distance between the hitch ball 18 and the trailer coupler 28.

The dynamic pixel images (arrow 25) may consist of a matrix of image pixels. In various non-limiting embodiments, the camera(s) 20 may be configured as an electro-optical device, e.g., a charged-couple device or a liquid lens camera, possibly with infra-red functionality to facilitate hitching operations conducted in low lighting conditions, such as when launching or loading a boat from a flat variant of the trailer 12 at night. The processor P, by executing the image processing instructions 56, is able to measure a linear distance to a calibrated pixel distance between identified edges of the dynamic pixel images (arrow 25) such that, within a fraction of an inch, the hitch ball 18-to-trailer coupler 28 alignment can be ascertained.

A local positioning device 30 enables the camera 20 to determine a position of the trailer coupler 28 in free space relative to the hitch ball 18. For instance, the local positioning device 30 may be connected to the trailer coupler 28 as shown. Those of ordinary skill in the art will appreciate that various alternative embodiments may be used to determine the relative position of the hitch ball 18 and trailer coupler 28, and therefore the example of FIG. 1 is not limiting. For instance, the local positioning device 30 may be located on the tow vehicle 10, with the receiver 128 in this instance being located on or in proximity to the trailer coupler 28. In other embodiments, the local positioning device 30 and the receiver 128 may both be collocated on the tow vehicle 10, and/or the image processing software may be used to help determine the location of the trailer coupler 28 via the collected dynamic pixel images (arrow 25).

The local positioning device 30 may be configured as a light beacon emitting light, for instance light pulses, or lidar or laser range finding embodiments where phase shifting or other principles of physics are used to determine the distance, as is known in the art. Alternatively, the local positioning device 30 may be sound wave transmitter operable for transmitting sound waves, e.g., an ultrasonic transmitter operable for transmitting sound waves in the ultrasonic frequency range, and/or an electromagnetic wave emitter operable for emitting electromagnetic waves such as radar waves, with the reflected signal being processed by the controller 50 to determine the distance.

In any of these example embodiments, the local positioning device 30 may be a Bluetooth-enabled or other wireless device activated via a wireless control signal (arrow W) by a driver of the tow vehicle 10 using the display screen 55 or other input device so as to cause the local positioning device 30 to transmit raw position data $P_R$. The raw position data $P_R$ can be detected by a receiver 128 in some embodiments, e.g., an antenna or a sound, electromagnetic, or light receiver. The receiver 128 could be located on the body 14 of the tow vehicle 10 separate from the local positioning device 30 or collocated with the local positioning device 30. The receiver 128 may relay coupler position signals (arrow $P_x$) to the controller 50, which in turn can process the coupler position signals (arrow $P_x$) and dynamically adjust a quality of a set of graphical overlays depicted on the display screen 55 using the calibrated position of the camera 20. The camera 20, local positioning device 30, receiver 128, display screen 55, and controller 50 described herein may collectively form a system in some embodiments, e.g., as an aftermarket system for use with the tow vehicle 10 and trailer 12.

FIGS. 2A, 2B, and 2C depict a first phase of an example trailer hitching operation. The trailer coupler 28 is connected to the trailer 12 and the hitch ball 18 to the tow vehicle 10 of FIG. 1, as explained above. Although omitted from FIGS. 2A-C for illustrative simplicity, the depicted trailer coupler 28 and hitch ball 18 are intended to represent a video feed from the camera 20 as it would appear to an operator of the tow vehicle 10 when viewing the display screen 55. In an actual application, the surrounding structure of the trailer 12 and tow vehicle 10 would also be visible via the display screen 55.

Upon initiating the guided trailer hitching operation, such as via selection of a displayed option on the display screen 55, or activation of a button or other input device, the controller 50 commands the display screen 55 to automatically display data from the camera 20, similar to what occurs in a typical backup camera when a vehicle is shifted into reverse. Upon activation of the local positioning device 30 via the wireless signal (arrow W) or via manual activation, the controller 50 processes the coupler position signals (arrow $P_x$) and calculates a trailer trajectory line (TL) as a graphical overlay to the display dynamic pixel images (arrow 25) on the display screen 55. The trailer trajectory line (TL) is a pathway between the hitch ball 18, whose position is calibrated and thus known to the controller 50, and the trailer coupler 28, whose position is known by virtue of the coupler position signals (arrow $P_x$). While shown as straight in FIGS. 2A-C for simplicity, the appearance of the trailer trajectory line (TL) is dynamically adjusted based on steering angle ($\theta_s$). At the same time, the controller 50 displays guidelines (GL) as another graphical overlay that is dynamically adjusted based on the steering angle ($\theta_s$), and that frames a calibrated-width path representing a path of the bed or other rear structure of the tow vehicle 10 as it backs toward the trailer coupler 28. In this manner, the guidelines (GL) visually indicate a swath of ground that will be covered by the tow vehicle 10 as the tow vehicle 10 closes a gap between the tow vehicle 10 and the trailer 12.

As shown in FIG. 2A, at the start of the hitching operation the trailer trajectory line (TL) may have a calibrated line thickness indicating correct linear alignment of the hitch ball 18 with the trailer coupler 28. The trailer trajectory line (TL) may be color-coded, e.g., as a solid green line of a particular thickness or line weighting, when the horizontal or horizontal and vertical alignment between the hitch ball 18 and the trailer coupler 28 is correct. Correct alignment with respect to the trailer trajectory line (TL) is any alignment in which the hitch ball 18 of the tow vehicle 10, if the tow vehicle 10 were to continue to move without steering deviation, would eventually intercept the trailer coupler 28. The color or other quality of the trailer trajectory line (TL) may be automatically changed via the controller 50 when the alignment is incorrect, e.g., by changing the trailer trajectory line (TL) from green to red as represented by the thinner trailer trajectory line (TL) of FIG. 2B, thereby color-coding the visual feedback to the operator of the tow vehicle 10. As the tow vehicle 10 approaches the trailer 12, the orientation and line lengths of the guidelines (GL) shorten to depict closer proximity of the trailer coupler 28, as shown in FIG. 2C.

In each of FIGS. 2A-C, the controller 50 may display an additional graphical overlay indicating the relative positions of the trailer coupler 28 and hitch ball 18. For instance, circles 29 and 52 or other geometric shapes may be used to highlight a center of the trailer coupler 28 and hitch ball 18, respectively. As the hitch ball 18 is ultimately covered by the trailer coupler 28 upon successful alignment, a possible embodiment includes a solid circle 52 and an open circle 29 of a larger diameter than the solid circle 52, the purpose of which is illustrated in FIGS. 3A-C.

FIGS. 3A-C collectively depict a second "close-in" phase of the guided hitching operation. In the second phase, the trailer coupler 28 and hitch ball 18 are in close proximity to each other, such as within 12 inches. The operator of the tow vehicle 10 attempts to properly align the hitch ball 18 with the trailer coupler 28 using fine control of the tow vehicle 10, i.e., via the braking signals (arrow $B_x$) and steering angle ($\theta_s$) of FIG. 1. When the linear distance between hitch ball 18 and the trailer coupler 28 is within a predetermined distance, the controller 50 may either control an optical zoom level of the camera 20 or perform a digital zoom operation on the collected dynamic pixel images (arrow 25) via the image processing instructions 56 of FIG. 1 if the camera 20 is a fixed focal length camera. In either configuration, the display screen 55 presents a close-up view of the trailer coupler 28 and the hitch ball 18 to facilitate fine control of the hitching operation over the last few inches of distance.

As noted above, the circles 29 and 52 may be used to highlight the respective centers of the trailer coupler 28 and hitch ball 18. The hitch ball 18 is still partially visible from the perspective of FIG. 3A, which is essentially directly under the camera 20 at this phase of the hitching process. However, the hitch ball 18 is substantially overlapped or fully covered by the trailer coupler 28 in FIGS. 3B and 3C from the perspective of the camera 20 as the driver of the tow vehicle 10 continues to move the tow vehicle 10 toward the trailer 12.

An embodiment is envisioned in which a solid circle 52 is indicative of the center of the hitch ball 18 and the open circle 29 of a larger diameter is indicative of the center of the trailer coupler 28 facilitates visual acquisition of a properly aligned hitch ball 18, as shown in FIG. 3C. Concentric alignment of the solid circle 52 and open circle 29 may be indicative of a properly aligned hitch ball 18 and trailer coupler 28. Once the view of FIG. 3C is depicted in the display screen 55 of FIG. 1, the driver receives visual confirmation that the hitch ball 18 is ready to be engaged with the trailer coupler 28, typically involving manually latching and insertion of a retaining pin (not shown) as is well known in the art.

Referring to FIG. 4, an example embodiment of the method 100 begins with steps S102, wherein an operator of the tow vehicle 10 of FIG. 1 signals to the controller 50 an intention to initiate a guided hitching operation, e.g., via input of a touch selection to the display screen 55. The camera 20 may turn on as a result of step S102. The method 100 then proceeds to step S104.

Step S104 may include activating the local positioning device 30 located, e.g., on the trailer coupler 28, or alternatively on the tow vehicle 10, for instance via transmission of a wireless signal (arrow W) to the positioning device 30 or by manually activating the local positioning device 30 via a switch or button (not shown). In other embodiments the image processing instructions 56 may be used alone to execute the following steps, with the image processing instructions 56 activated or initialized at step S104. The method 100 then proceeds to step S106 as the controller 50, via the camera 20 connected to the tow vehicle 10, begins collecting the dynamic pixel images (arrow 25) of the trailer coupler 28. The hitch ball 18 will likely also be seen in the dynamic pixel images (arrow 25), particularly in embodiments using a single camera 20. However, images of the hitch ball 18 are not necessarily required during the first phase of the hitching operation. That is, step S104 could entail collecting only dynamic pixel images (arrow 25) of the trailer coupler 28.

At step S106, the controller 50 determines a position of the trailer coupler 28 using the positioning signals (arrow $P_x$) from the receiver 128, and/or may use the image processing instructions 56 to determine the positioning signals (arrow $P_x$) from the dynamic pixel images (arrow 25) in other embodiments, for example using 2D-to-3D range imaging of the type known in the art. The controller 50 also displays guidelines (GL) on the display screen 55 via a first graphical overlay to the collected dynamic pixel images (arrow 25) in the first phase of the guided hitching operation. As noted above, the guidelines (GL) graphically depict a path of the tow vehicle 10 to the trailer coupler 28, and thus are dynamically adjusted based on the steering angle ($\theta_s$). That is, an orientation of the guidelines (GL) on the display screen changes in response to the steering angle ($\theta_s$). As part of step S106, the controller 50 calculates a distance between a calibrated or known position of the hitch ball 18 and the determined position of the trailer coupler 28. In this manner, the controller 50 can determine when the trailer coupler 28 is within a calibrated distance of the hitch ball 18, for instance within 12 inches or closer.

Step S106 can be visualized with reference to FIGS. 2A-C as the tow vehicle 10 slowly backs toward the trailer 12. Step S106 continues in a loop until the first calibrated distance is detected and then proceeds to step S108. While executing step S106, the controller 50 continues to automatically and dynamically adjust the depiction of the graphical overlays, including the appearance and/or orientation of the guidelines (GL) and the trailer trajectory line (TL) on the display screen 55. Audio feedback could also be used to enhance the feedback to the driver, such as by sounding a warning tone when the alignment is incorrect.

At step S108, the controller 50 discontinues display of the guidelines (GL) of FIGS. 2A-C and executes zoom level control of the camera 20 or the collected dynamic pixel images (arrow 25), e.g., by automatically increasing a zoom level of the camera 20, or by optionally switching to control of a different camera 20 on the tow vehicle 10 if the tow vehicle 10 is equipped with multiple cameras 20, to present close-up images of the trailer coupler 28 and hitch ball 18, as best shown in FIGS. 3A-C. In other words, step S108 entails displaying a second graphical overlay on a zoomed-in view of the trailer coupler 28 and the hitch ball 18 via the controller 50 using the display screen 55 when the calculated distance between the hitch ball 18 and the trailer coupler 28 is less than the calibrated distance noted above, with the second graphical overlay providing an indicia of the respective positions of the hitch ball 18 and trailer coupler 28 in the close-up view. Step S108 may include cropping the collected pixel images (arrow 25) to a small window in which the trailer coupler 28 and hitch ball 18 fill most of the display screen 55 of FIG. 1. The method 100 then proceeds to step S110.

Step S110 includes determining, via the controller 50, if the trailer coupler 28 and the hitch ball 18 are sufficiently aligned, as depicted in FIG. 3C. Step S110 continues in a loop and automatically adjusts the graphical overlays, including the appearance and orientation of the circles 29 and 52 or other indicia of FIGS. 3A-3C to give the driver visual feedback of the fine alignment of the trailer coupler 28 and hitch ball 18. The method 100 continues to step S112 when the trailer coupler 28 and hitch ball 18 are aligned.

Step S112 includes executing a control action when the graphical overlays of step S110, e.g., the circles 29 and 52 or other indicia of the respective positions of the hitch ball 18 and trailer coupler 28, indicate a concentric alignment of the indicia, or at least a substantial overlap, i.e., at least 90% of the area of the circle 52 lies within the circle 29. Step S112 may include activating an audio and/or visual indicator to the driver that the trailer coupler 28 and hitch ball 18 are properly aligned for the purposes of completing the hitching operation. Audio and/or visual feedback could be used at step S112 similar to step S106 in order to alert the driver that the trailer coupler 28 is ready to be latched and secured to the hitch ball 18. For example, the circles 29 and 52 or other indicia could be color-coded, turned on and off in a blinking pattern, or a text message could be displayed via the display screen 55 informing the driver of sufficient concentric alignment of the indicia, and thus sufficient alignment of the trailer coupler 28 and hitch ball 18. A chime tone may sound indicating that the alignment is correct, either or all of which serve to instruct the driver to secure the trailer coupler 28 to the hitch ball 18.

Those of ordinary skill in the art will appreciate that other embodiments may be envisioned within the scope of the disclosure. For example, the camera 20 may be a 360° surround view camera, or may be mounted to other areas of the tow vehicle 10 than depicted in FIG. 1. Additionally, the controller 50 may be programmed to execute an autonomous guided trailer hitching operation in other embodiments. By way of example, the braking inputs (arrow $B_x$) and steering angle ($\theta_s$), ordinarily input by a driver of the tow vehicle 10 and processed by the controller 50, may instead be generated by the controller 50 and applied autonomously such that the entire process can be executed autonomously by the controller 50. In such an embodiment, the controller 50 could be programmed to be overridden if threshold driver inputs in the form of the braking inputs (arrow $B_x$) and/or steering angle ($\theta_s$) are detected, thereafter reverting to driver-controlled functionality.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for providing guided control of a hitching operation between a tow vehicle having a first hitch device and a trailer having a second hitch device engageable with the first hitch device, the method comprising:
    collecting dynamic pixel images of the first and second hitch devices using a camera connected to the tow vehicle;
    determining a position of the second hitch device relative to the first hitch device via a controller using raw position data signals received from a local positioning device operable to transmit the raw position data signals;
    displaying a first graphical overlay to the collected dynamic pixel images of the second hitch device on a display screen, via the controller, wherein the first graphical overlay depicts a path to attach the first hitch device of the tow vehicle to the second hitch device of the trailer and a trajectory line between the first and second hitch devices;
    calculating, via the controller, a distance between a calibrated position of the first hitch device and the determined position of the second hitch device;
    automatically increasing a zoom level of the camera and displaying a second graphical overlay to the collected dynamic pixel images at the increased zoom level, via the controller using the display screen, when the calculated distance is less than a calibrated distance, wherein the second graphical overlay includes indicia of the respective positions of the first and second hitch devices; and
    executing a control action via the controller when the second graphical overlay indicates substantial overlap of the indicia of the respective positions indicating that the first and second hitch devices are aligned to complete the hitching operation, the control action including activating at least one of an audio and a visual indicator signaling the substantial overlap.

2. The method of claim 1, wherein the local positioning device is connected to the first or second hitch device, and wherein determining a position of the second hitch device includes detecting the raw position data via a receiver connected to one of the trailer and the tow vehicle.

3. The method of claim 2, wherein the local positioning device is a light beacon and the raw position data includes light signals.

4. The method of claim 2, wherein the local positioning device is a sound wave transmitter and the raw position data includes sound waves transmitted by the sound wave transmitter.

5. The method of claim 4, wherein the sound wave transmitter is an ultrasonic transmitter and the sound waves are in the ultrasonic frequency range.

6. The method of claim 2, wherein the local positioning device is an electromagnetic wave transmitter and the raw position data includes electromagnetic waves transmitted by the electromagnetic wave transmitter.

7. The method of claim 1, further comprising color-coding the first and/or second graphical overlays with a first color to represent correct alignment of the first and second hitch devices and with a second color to represent incorrect alignment of the first and second hitch devices.

8. The method of claim 1, wherein the first hitch device is a hitch ball and the second hitch device is a trailer coupler.

9. The method of claim 1, wherein displaying a second graphical overlay with the indicia includes displaying, on the dynamic pixel images, an open circle over the second hitch device of the trailer and a closed circle on the first hitch device of the tow vehicle, and wherein the second graphical overlay indicates the substantial overlap via concentric alignment of the open and closed circles.

10. The method of claim 1, further comprising dynamically adjusting an orientation of the first graphical overlay on the display screen, via the controller, in response to a steering angle of the tow vehicle.

11. A system for providing guided control of a hitching operation between a tow vehicle having a first hitch device and a trailer having a second hitch device, the system comprising:
    a camera operable for collecting dynamic pixel images of the first and second hitch devices;
    a local positioning device connectable to one of the first and second hitch devices, and operable for emitting raw position signals;
    a receiver in communication with the local positioning device and operable for receiving the raw position signals for determining a position of the second hitch device relative to the first hitch device;
    a display screen; and
    a controller in communication with the camera, the display screen, and the receiver, the controller being programmed to:
        direct the display screen to display guidelines on the collected dynamic pixel images, wherein the displayed guidelines depict a path to attach the first hitch device of the tow vehicle to the second hitch device of the trailer;

calculate a distance between a calibrated position of the first hitch device and the determined position of the second hitch device;

automatically increase a zoom level of the camera and direct the display screen to display a second graphical overlay on the collected dynamic pixel images at the increased zoom level when the calculated distance is less than a calibrated distance, wherein the second graphical overlay includes indicia of the respective positions of the first and second hitch devices; and execute a control action when the second graphical overlay indicates a substantial overlap of the indicia of the respective positions indicating that the first and second hitch devices are aligned to complete the hitching operation, the control action including activating at least one of an audio and a visual indicator signaling the substantial overlap.

12. The system of claim 11, wherein the local positioning device is connected to the second hitch device, and wherein the controller is programmed to determine the position of the second hitch device by processing the raw position data.

13. The system of claim 11, wherein the local positioning device is a light beacon and the raw position data are light signals.

14. The system of claim 11, wherein the local positioning device is a sound wave transmitter and the raw position data includes sound waves transmitted by the sound wave transmitter.

15. The system of claim 11, wherein the local positioning device is an electromagnetic wave transmitter and the raw position data includes electromagnetic waves transmitted by the electromagnetic wave transmitter.

16. The system of claim 11, wherein the controller is programmed to color-code the displayed guidelines with a first color to represent correct alignment of the first and second hitch devices and with a second color to represent incorrect alignment of the first and second hitch devices.

17. The system of claim 11, wherein the first hitch device is a hitch ball and the second hitch device is a trailer coupler.

18. The system of claim 11, wherein the controller is programmed to direct the display screen to display the second graphical overlay with the indicia as an open circle over the second hitch device of the trailer and a closed circle on the first hitch device of the tow vehicle, and wherein the second graphical overlay indicates the substantial overlap via concentric alignment of the open and closed circles.

19. The system of claim 11, wherein the controller is programmed to dynamically adjust an orientation of the first graphical overlay in response to a steering angle of the tow vehicle.

20. A motor vehicle operable for towing a trailer using a first hitch device, the trailer having a positioning device and a second hitch device configured to releasably attach to the first hitch device, the motor vehicle comprising:

a vehicle body with a front end opposite a rear end, the rear end of the vehicle body including vehicle structure configured to receive and attach to the first hitch device;

a camera attached to the vehicle body proximate the rear end thereof, the camera being operable to dynamically capture images of the first and second hitch devices and generate pixel images thereof;

a receiver attached to the vehicle body and operable to communicate with the positioning device to receive therefrom raw position signals for determining a position of the second hitch device relative to the first hitch device;

a display screen attached to the vehicle body; and a controller in communication with the camera, the receiver, and the display screen, the controller being programmed to:

determine a position of the second hitch device relative to the first hitch device using the raw position signals received from the positioning device;

direct the display screen to display the pixel images of the first and second hitch devices with path guidelines superimposed over the displayed images, the path guidelines including a path of the vehicle to attach the first hitch device to the second hitch device;

calculate a distance between a calibrated position of the first hitch device and the determined position of the second hitch device;

responsive to the calculated distance being less than a calibrated distance, direct the display screen to display enlarged images of the first and second hitch devices with first and second graphical indicia superimposed over the enlarged images of the hitch devices, each the graphical indicia indicating a respective position of a respective one of the hitch devices; and responsive to a substantial overlap of the first and second graphical indicia, which indicates that the first and second hitch devices are sufficiently aligned to attach the hitch devices, direct the display device to output a visual cue signaling the substantial overlap.

* * * * *